Dec. 5, 1967  T. B. ORTWIG ET AL  3,356,799
ELECTRIC DISCONNECT SWITCH
Filed Aug. 12, 1966  3 Sheets-Sheet 1

INVENTORS
THOMAS B. ORTWIG &
BY JOSEPH L. KRAWINKEL, JR.

John H. Sutherland

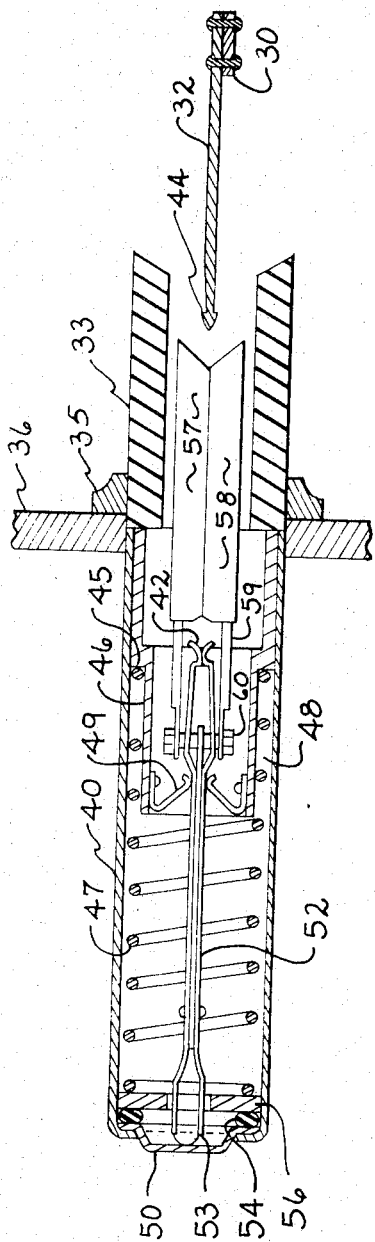
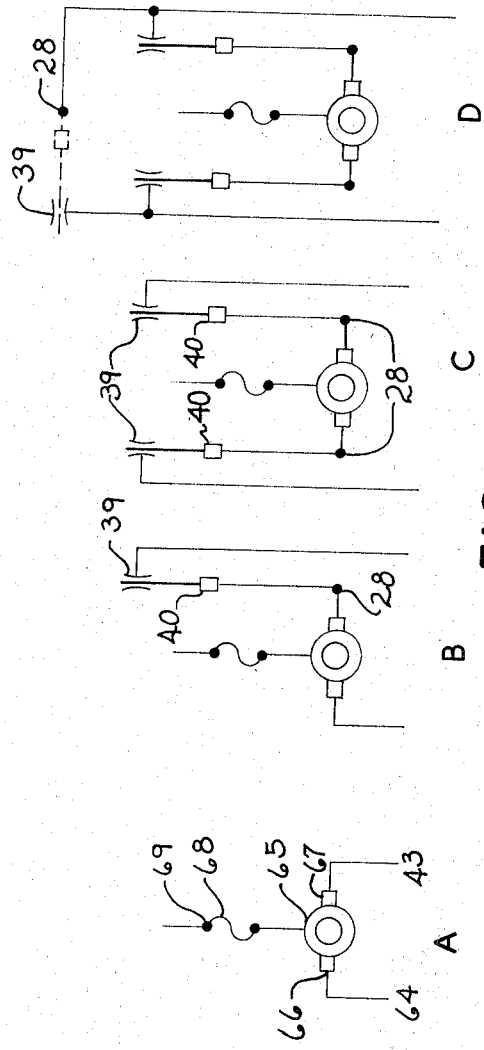
FIG. 3
FIG. 4
INVENTORS
THOMAS B. ORTWIG &
JOSEPH L. KRAWINKEL, JR.
BY United States Patent Office 3,356,799
Patented Dec. 5, 1967

3,356,799
ELECTRIC DISCONNECT SWITCH
Thomas B. Ortwig, Florissant, and Joseph L. Krawinkel,
Jr., St. Louis, Mo., assignors to Kearney-National Inc.,
St. Louis, Mo., a corporation of Delaware
Filed Aug. 12, 1966, Ser. No. 572,054
6 Claims. (Cl. 200—48)

ABSTRACT OF THE DISCLOSURE

An electrical disconnect switch having a conductive stab projecting from the blade, the blade making electrical contact with one pair of contacts and the conductive stab making electrical contact with a second pair of contacts mounted within the insulator that supports the first pair of contacts.

---

This application is a continuation-in-part of our copending application Ser. No. 348,713, now U.S. Patent No. 3,283,214, filed Mar. 2, 1964.

This invention relates to improvements in electric disconnects applicable to electrical distribution systems, and more particularly to the type of switch that may be used indoors or in an outdoor enclosure of the cabinet or pedestal variety which forms a control or connection center for part of the system.

In distribution systems used to supply power to a plurality of transformers, various electrical circuitry may be involved from system to system. In each particular system, however, it is generally desirable that each transformer have electric disconnects that provide for isolation from the high voltage side of the system in order to carry out routine maintenance and repairs when necessary. Accordingly, it is sometimes considered necessary to provide a transformer, or the like, with a plurality of disconnects to accomplish these several purposes.

In the present invention, a single disconnect is illustrated that may be individually or collectively arranged to provide for the above functions. The disconnect is of the air-break type that includes, at one extremity thereof, a hinge which enables the blade to be removed from the remaining assembly after the circuit is broken, and which, without such removal, limits the amplitude of blade movement in the opening direction. Furthermore, removability of the blade portion of the disconnect permits closure of the cabinet after the circuit has been broken and after the blade portions has been removed, so as to enable the cabinet to be locked, thereby making it doubly tamper-proof while the work is being carried out on the de-energized circuitry.

The present invention additionally includes means built into the disconnect to suppress or extinguish the arc always formed when the disconnect is opened under load.

The novel disconnect is provided pre-assembled upon a channel base with the hinged end and swing end of the blade suitably mounted upon spaced apart insulators, one of which houses the before-mentioned arc suppressor. Various combinations of the single disconnect illustrated herein can be arranged and combined with or without a fuse to provide the same switching function that is presently covered by more complex and different switching arrangements.

The channel base is a steel stamping in the form of an elongated U-shaped member that provides legs to stand-off the insulators from the panel bulkhead.

It is accordingly an object of this invention to provide a single disconnect which is simple in design and rugged in construction that may be pre-assembled upon a base, so as to provide rapid field installation of the assembly.

Another object of this invention is the provision of a disconnect of the single-throw, single-pole type having a separable hinged member associated therewith that enables removal of the blade portion of the switch only at a predetermined position in its orbit.

Still a further object of this invention is the provision of an electrical disconnect of the single-throw, singe-pole variety, and having an arc suppressor associated with the swing end, or contact end, thereof, so as to prevent excessive arcing upon opening of the disconnect.

Another object of this invention is the provision of a disconnect suitably mounted upon spaced-apart insulators that in turn are rigidly secured to a U-shaped channel base, and wherein the entire assembly may be readily substituted for like or different assemblies by merely securing the channel base to the control panel, or the like, as an integral or self-contained unit.

Other objects and features of the invention will be more readily appreciated from a consideration of the following detailed description taken in conjunction with the accompanying drawings, in which:

FIGURE 3 is a view partially in section taken along line 3—3 of FIGURE 2, showing the internal details of the arc suppressor assembly whose housing is shown in FIGURE 1;

FIGURE 4 is a series of circuit diagrams showing possible operational variants of the disconnect.

Figure 1:
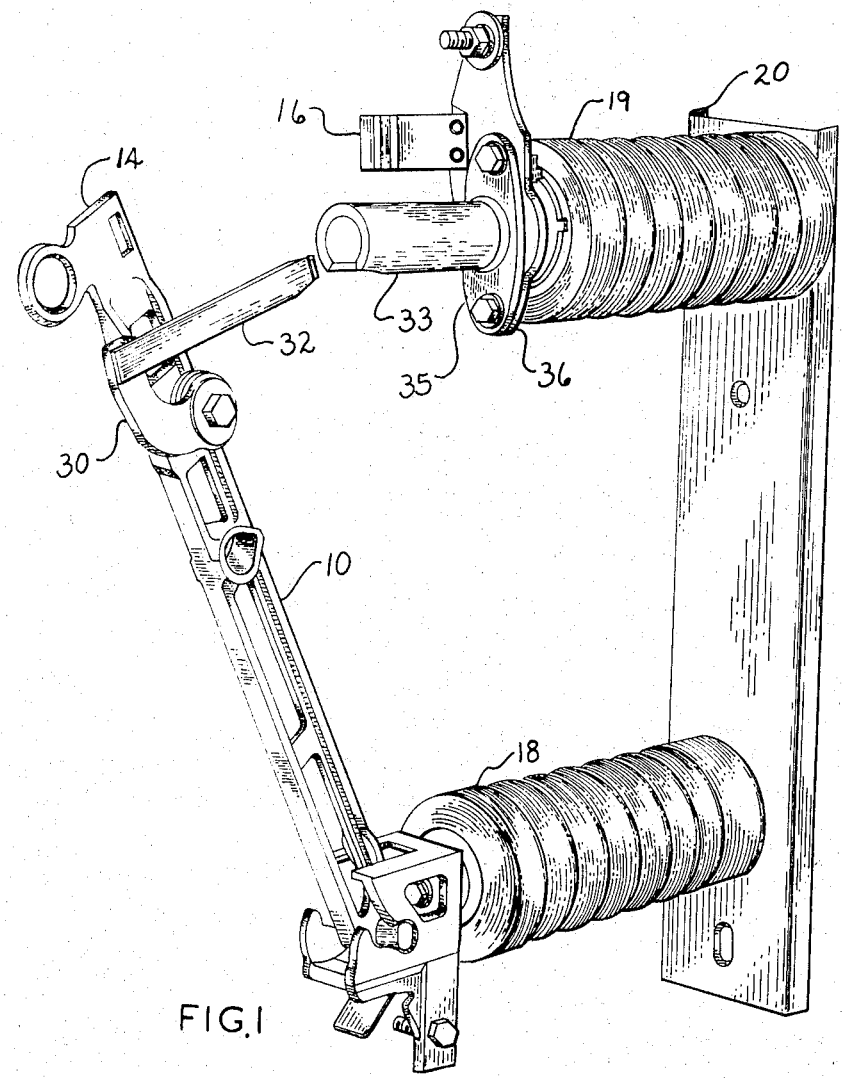
FIGURE 1 is a perspective view of the novel disconnect, showing the device in hinged open relationship, or de-energized and disconnected condition, but with the blade left in hinged relationship to the remaining disconnect structure.

Looking now to the details of FIGURE 1 taken in conjunction with the remaining figures, there is shown the novel switch having a blade 10 that includes a hinged end with opposite stub shafts 12, and an end 14 that swings into engagement with resilient fixed contacts 16. The respective extremities of the blade 10 cooperate with parts carried by insulators 18 and 19 which, in turn, are rigidly, but eccentrically, mounted to the outer section 20 of the channel base 21.

Figure 2:
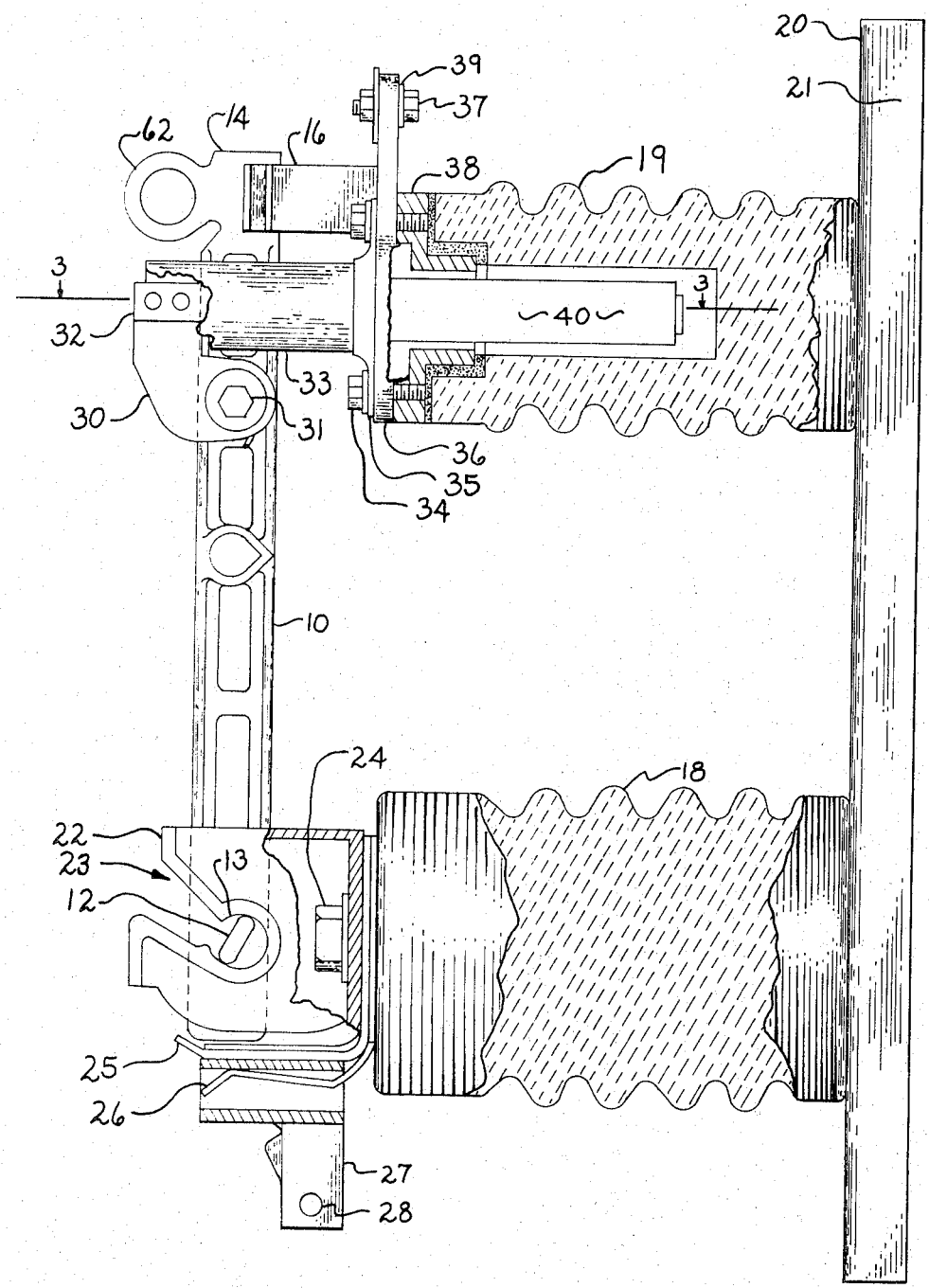
FIGURE 2 is a side elevational view of the switch of FIGURE 1, with some parts broken away and shown in section so as to better illustrate certain features hidden therein.

Insulator 18 carries bracket 22 secured thereto by bolt 24, which also holds resilient members 25, 26 secured therebetween which are pressed against the lower end of blade 10 so as to assure good conductivity between the bracket and blade member. Depending from the lower extremity of bracket 22 is a terminal 27 having an aperture 28. As seen in FIGURE 2, the bracket 22 is bifurcated so as to present a yoke-like member having a slot 23 in each of its spaced legs. Each slot 23 receives one of the stub shafts 12. The latter are preferably cast as integral parts of blade 10, and are chordally flattened on at least one side. As seen in FIGURE 2, the stub shafts 12 are received in the C-shaped hinge portion 13 of member 22. When the blade 10 is pivoted to a position 90° counterclockwise from that seen in FIGURE 2, the flat sides of the stub shafts 12 are longitudinally aligned with the slot 23 so that the blade may be removed and reinserted. Accordingly, when the blade 10 is rotated into the vertical position of FIGURE 2, the stub shafts 12 are locked within the C-shaped portion 13 of hinge member 22, where it is then suitably held until the blade is again opened. The opening movement is, however, limited by a cast portion (not shown) inside member 22 lying in the path of movement of the portion of blade 10 below a position where the blade is approximately 90° from its closed circuit position.

The swing end 14 of the blade shown in FIGURE 2 is received between resilient stationary contacts 16 which (when the switch is closed) provide the main conductive path between blade end 14 and a fixed plate 36 to which another line conductor is connected in use. The stationary contacts 16 preferably consist of two leaves of highly conductive materials, positioned respectively for direct engagement with opposite sides of blade-end 14, and backed up exteriorly by two leaves of spring-tempered materials. The leaves of highly conductive materials are divided in a position to interengage a rectangular slot in the blade-end 14 when the switch is fully closed, thereby to retain the blade 10 in closed circuit position. The plate 36 is mounted on insulator 19 through the agency of insulator insert 38, but contacts 16 are eccentric (both vertically and horizontally) with respect to said insulator.

Located below contacts 16, is in auxiliary conductive path including a more or less L-shaped bracket 30 mounted in offset relationship to blade 10 which firmly, yet with limited pivotability, connects bracket 30 to the blade 10. Bracket 30 carries stab electrode 32 suitably attached thereto, as by riveting or the like, and bracket 30 is spring-biased to a position (relative to blade 10) approximating that shown in FIGURE 1 so that, when the blade 10 is in open-circuit position, the stab 32 will always be pointed at the mouth of hollow arc shield 33. When the switch is in circuit closing position, the stab 32 is received within the hollow arc shield 33 in a manner that is further illustrated in FIGURE 3. The arc shield is part of an arc-suppressor assembly 40 which is received within an axial cavity within insulator 19. The arc shield 33, with adjunct parts, is secured, through plate 36 by bolts 34 and collar 35, to an insulator insert 38. The insulator insert 38 is permanently cemented, or otherwise attached, to the insulator 19 in a permanent manner. Extending upwardly from conductor plate 36 is a lug 39 that cooperates with a bolt 37, so as to receive a line conductor.

The arc-suppressor assembly 40 projects inwardly of insulator 19 from the conductor plate 36, is of the type disclosed in our aforesaid application Ser. No. 348,713, and has a lost motion coupling with a set of contacts therein which are adapted to cooperate in current flow relationship with the stab electrode 32 after the swing end 14 of the blade has cleared the fixed set of contacts 16 while moving in circuit opening direction, as will be explained more fully below.

Looking now to the details of FIGURE 3, there is seen, in sectional view, the mechanism of an arc-suppressor 40 in disengaged condition with respect to the electrode 32. The electrically conductive tubular housing of arc-suppressor 40 is rigidly attached to the conductive collar 35, which in turn is bolted onto the conductor plate 36 by bolts 34 in a manner which electrically and mechanically connects arc-suppressor 40 in fixed position with respect to the supporting structure of the disconnect. Within the arc-suppressor assembly 40, there is located a spring-loaded set of resilient jaws 42 that grip with the bulbous, or enlarged, portion 44 of the electrode 32 to form a mechanical and electrical connection when blade 10 is in its circuit closing position. The jaws 42 have a lost motion mounting, so as to move with stab 32 during the early stages of circuit-opening movement of blade 10, but release after the main electrical path through 16 has opened. Resilient jaws 42 are mounted upon connecting rod 52 which is sprung from shoulder 45 of conductive housing 46 by a compressed spring 47 that is received within the annular space 48 between the housing 46 and the tubular body of load interrupter 40. The connecting rod 52 is suitably pinned at 53 below a disk 56, which abuts the spring 47. The disc is compressed between the end of spring 47 and a rubber O-ring 54 which is sandwiched between the lower surface of disk 56 and cap 50. The purpose of the O-ring is to reduce the shock that otherwise would occur upon release of the spring-loaded disk member when the device is triggered. Snuffer elements 57 and 58 are slidably received within the shield 33, so as to reciprocate therein along with jaws 42 during the aforesaid lost motion. The snuffer elements 57 and 58 are identical, but reversely oriented, and connected through leaf spring legs 59 and pin 60 to the jaws 42 and connecting rod 52.

Figure 5:
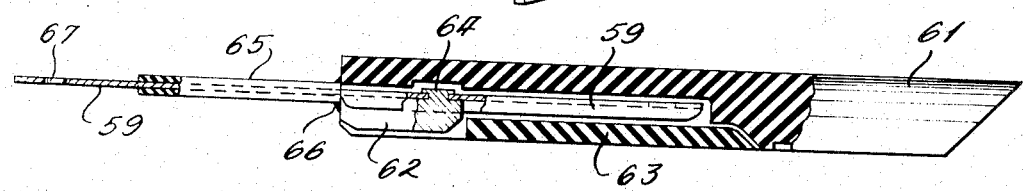
FIGURE 5 is a longitudinal sectional view of one of the components of the arc suppressor assembly shown in FIGURE 3.

A typical snuffer element is shown in FIGURE 5, and comprises a finger 61 of insulating material, convex on the outside (addressed toward the concave interior shield 33) and substantially flat on the inside (addressed toward the companion snuffer element). The flat side of each finger 61 is recessed to accommodate a sub-assembly consisting of leaf spring 59, a contact block 62, and an inlay 63 of plastic material of a character which releases an arc-snuffing gas upon thermal degradation or pyrolysis brought about by the heat generated by the arc being extinguished. The contact block 62 is electrically conductive and disposed to engage one side of stab 32, but is preferably of material which does not melt under exposure to the heat generated while the arc is being snuffed. A satisfactory such material is an alloy of about: 80% tungsten, 19% copper, and 1% nickel. The contact block 62 is preferably cast with a short integral stem 64 projecting therefrom. To assemble the block 62 with leaf spring 59, the stem 64 is passed through a hole in the leaf spring and peened over as a rivet. The sub-assembly 59–62–64 is secured to finger 61 by encasing a part of spring 59 in a tight-fitting sheath 65 of insulating material, and cementing the sheath to the root end of finger 61 as shown at 66. The spring 59 is preferably arcuate in cross-section to give it stiffness, which biases the snuffers 57 and 58 toward each other, and is provided with a hole 67 for the reception of pin 60.

Thus the arrangement of the arc suppressing assembly is such that in the course of opening the disconnect, the snuffers 57 and 58 move outwardly relative to arc shield 33 concurrently with the motion of blade 10 which first breaks the circuit at 14–16, next breaks the circuit at 32–42, and lastly breaks the circuit at 32–62 when the arc is drawn adjacent inlay 63.

In operation, the closing of blade 10 forces stab 32 between snuffer elements 57 and 58, and ultimately forces bulbous portion 44 of electrode 32 between the resilient jaws 42. Since the electrode 32 is slidably received between snuffer elements 57 and 58 longitudinally thereof so as to separate snuffer elements 57 and 58 a sufficient amount to permit insertion of electrode 32 therethrough and into releasable conductive engagement with resilient contacts 42. At about the same time, the swing end 14 of blade 10 is making electrical engagement with the pair of fixed resilient contacts 16, so that when the blade 10 is in the fully closed position, the current flow at 39 predominantly occurs through the heavier pair of fixed contacts 16 directly to the blade 10, although another, or parallel, path of current flow is made through the upwardly projecting lug 39 to the conductor plate 36, the tubular housing of assembly 40, inner housing 46, wiper contacts 49, and, perhaps to some negligible extent, through disk member 56, connecting rod 52, resilient jaws 42, stab 32, L-shaped bracket 30, and finally into the blade 10. The current then flows through the resilient members 25 and 26 that are resiliently biased against the lower end of the blade 10 although a substantial portion of the current may also flow through the stub shafts 12 and into the bracket 22, where the current may then proceed to the load through terminal 27. When it is desired to disconnect the load at 27 from the current source at 39, a hot stick may be inserted through the apertured lug at 62 so as to disengage the swing end of the blade by pulling outwardly and downwardly in an arcuate direction so as to interrupt the current flow. After the swing end of the blade has been pulled away from the various portions carried by the upper insulator 19, the technician can visually observe that both the swing portion 14 and the electrode 32 are disengaged from their respective contacts, and the blade 10, along with its affixed component parts, may then be lifted from the C-shaped hinge member by sliding the stub shafts 12 upwardly and outwardly from the slot 23 of the bracket 22. This entire operation may be accomplished by using a hot stick. The control panel may then be closed and locked until it is desired to again energize the circuitry whereupon the blade 10 is replaced by reversing the preceding disconnecting steps.

With the disconnect in the position of FIGURE 2, upon insertion of the hot stick in the apertured lug 62, the contact between the swing end 14 and the fixed resilient contact 16 is first broken. As the blade continues to swing outwardly from resilient contact, and since the current path through resilient contact 16 has been broken, the current flow now follows the second above-described path, to wit: terminal portion of lug 39, conductor plate 36, the outside housing of assembly 40, inside housing 46, wiper contacts 49 (and perhaps a certain amount through the disk 56, pin 53, connecting rod 52), and thence from the resilient contacts 42 and contact blocks 62 into the stab electrode 32, the L-shaped bracket 30, bolt 31, blade 10, and from there along the before-described path to the load connected at aperture 28 of terminal 27. The enlargement 44 is held releasably secured within contacts 42, which are spring-pressed together in a manner that will remain engaged with the enlargement as the contacts 42, along with arm 52, pull the disk 56 in an outward direction following along with the blade and electrode 32 a limited distance until the disk 56 abuts the reduced depending free-end portion of the inside housing 46, whereupon the force, or tension, provided by the electrode 32 becomes greater than, and overcomes the force of, the resilient contacts 42 holding the bulbous portion 44 so that bulbous portion 44 of electrode 32 is released from between the resilient contacts 42, thereby breaking the circuit first at 42 and ultimately at 62. The spring 47, up to this time, has been compressed within the limits between the shoulder 45 and the disk 56, with the disk being positioned in abutting relationship with the depending end of the inside housing. Upon the device being triggered by the release of the bulbous head 44 from between the resilient contacts 42, the disk, or plunger 56, is driven back to its original position at its extreme length of travel to where it again abuts the cap and O-ring 54. Once the snuffers 57 and 58 pass the enlargement 44, their resilient mountings cause them to close tightly face-to-face in abutting relationship, and thereby pinch off, or snuff out, any arc formed between the bulbous end 44 and the resilient contacts 42. Further movement of the blade 10 then withdraws the electrode 32 completely clear of the upper components of the disconnect, to the position of FIGURE 1, for example.

Upon replacing the blade 10 so as to again provide for the flow of current, the sequence of events taking place is substantially the reverse of the foregoing, except in reengagement the electrode 32 is the first to make contact with the resilient snuffers 57 and 58, and thereafter the swing end of the blade engages the stationary resilient contacts 16 whereupon the current flow is reestablished to the load at lug 27.

FIGURE 4 shows several applications where the disconnect may be advantageously used in several basic circuit arrangements. The first wiring diagram shows a looped disconnect having incoming leads 63 and 64 connected to an insulator 65 having terminals 66 and 67 thereon, from which there is connected a conductor having a fuse 68 connected in series with terminal portion 69 that is adapted to be connected to the primary of a transformer. The first wiring diagram (A) obviously employs no loop disconnect, and consequently, removal of fuse 68 must be relied upon in order to disconnect the primary terminal portion 69 from the loop formed by legs 63 and 64.

Wiring diagram (B) of FIGURE 4 shows a single loop disconnect connected in series with the before-mentioned insulator terminal post 67 and the incoming leg of loop 63. The single loop disconnect includes the switch terminal portion 39 and the hinged terminal portion 28 of the previously described novel electrical disconnect and includes the arc suppressor 40.

Wiring diagram (C) of FIGURE 4 illustrates two of the novel electrical disconnects placed in series with each of the incoming looped disconnect legs 63 and 64 with each disconnect being attached to terminal portion 66 and 67 of the insulator 65. The wiring diagram (C) of FIGURE 4 enables either or both legs 63 and 64 of the incoming loop to be isolated from the transformer primary.

Wiring diagram (D) of FIGURE 4 illustrates a still further modification wherein a third disconnect is arranged so as to provide a jumper electrically connected between legs 63 and 64 of the loop, whereby either of the blades of the disconnect may be removed and inserted into third and empty blade-receiving disconnecting means so as to provide a jumper between the legs of the looped disconnect. Removal of the second blade from the second disconnect will de-energize the primary of the transformer leading from the fuse, while at the same time, the two legs will be electrically connected together by the third disconnect, if such an arrangement is deemed desirable.

The above various wiring diagrams of FIGURE 4 are merely exemplary of one of several possible arrangements that may be assembled by using various different configurations involving several of the novel electrical disconnects.

Although the preferred form of our invention has been shown in the accompanying drawings and described hereinbefore, it is manifest that it is capable of further modification and rearrangement without departing from the spirit and scope thereof. We do not, therefore, wish to be understood as limiting our invention to the specific forms herein shown and described, except as so limited in the appended claims.

Having thus described the invention, what is claimed and desired to be secured by Letters Patent is:

1. A separable type electrical disconnect switch comprising: a channel base adapted to be mounted on a control panel, or the like, and having means mounting spaced apart upper and lower insulators thereon; a blade having a hinged end and a contact end with said hinged end having means hingedly attached in current conductive relationship to a conductive part mounted on said lower insulator, and said contact end having means cooperating therewith to resiliently and removably maintain the contact end electrically engaged with a conductive part mounted on said upper insulator; said means hingedly attached to said lower insulator including a flattened shaft extending from the blade, and a yoke having C-shaped, aligned apertures forming an electrical conductor rigidly mounted on said lower insulator, with said shaft being releasably held in said aperture; means cooperating with said contact end having a first pair of switch means mounted on said upper insulator for selective engagement with the contact end of said blade, a second pair of switch means mounted within said upper insulator, and electrically connected with said first pair of switch means; a conductive stab pivotally mounted on, movable with and projecting from said blade toward said second pair of switch means for conductive engagement during engagement between said blade and said first pair of switch means, means for delaying disengagement of said stab from said second pair of switch means until after said blade has separated from said first pair of switch means; and insulating means embracing the path of said stab during movement thereof toward and away from said second pair of switch means.

2. The device of claim 1, wherein said channel member is comprised of an elongated, stamped-out, U-shaped member having apertures formed therein to provide for said mounting and wherein said insulators are rigidly affixed to the surface thereof, so as to provide a platform having depending legs therefrom that form a ventilated air space thereunder.

3. The device of claim 2, and further including an up-standing apertured lug associated with the contact end of said upper insulator, a downwardly depending lug integrally attached with the hinged end of said lower insulator whereby said disconnect may be readily installed in existing circuits by externally wiring electrical conduits to the before said lugs.

4. A separable type electrical disconnect switch comprising: a channel base adapted to be mounted on a control panel, or the like, and having means mounting spaced apart upper and lower insulators thereon; a blade having a hinged end and a contact end with said hinged end having means hingedly attached in current flowing relationship to said lower insulator, and said contact end having means cooperating therewith to resiliently and removably maintain the contact end electrically engaged with said upper insulator; said means hingedly attached to said lower insulator including a flattened shaft extending from the blade, and a yoke having C-shaped aligned apertures forming an electrical conductor rigidly mounted on said lower insulator, with said shaft being releasably held in said aperture; said means cooperating with said contact end having a first pair of switch means mounted on said upper insulator in cooperative relationship with the contact end of said blade, and a second pair of switch means including an electrode and a set of contacts mounted within said upper insulator; said electrode being mounted on said blade in cooperative aligned relationship to said set of contacts mounted within said upper insulator, and further having lost motion coupling means associated therewith; whereby said blade may be pivoted at said hinge end to electrically disconnect the contact end whereupon the first switch means will open prior to the second switch means opening to thereby provide for extinguishment of any arc formed upon opening of the disconnect, and said blade may be removed from said hinge by aligning the flattened shaft with the open portion of the C-shaped aperture.

5. The device of claim 4, having arc-suppressing means embracing said electrode while the latter is moving toward and away from said set of contacts.

6. The device of claim 5 wherein the contact portion of said insulator is provided with an apertured lug adapted to be connected to a source of power; and the hinge portion of said lower insulator is provided with a downwardly depending lug adapted to be connected to load, whereby said disconnect may be readily wired into service by said depending lugs.

References Cited

UNITED STATES PATENTS

| | | | |
|---|---|---|---|
| 2,073,565 | 3/1937 | Ruppel | 200—149.1 |
| 2,237,801 | 4/1941 | Williams | 200—114 |
| 2,308,026 | 1/1943 | Rawlins | 200—62 |
| 2,351,826 | 6/1944 | Lindell et al. | 200—149.1 X |
| 2,734,964 | 2/1956 | Edwards et al. | 200—114 |
| 3,284,590 | 11/1966 | Hondalus | 200—48 |

ROBERT K. SCHAEFER, *Primary Examiner.*

H. HOHAUSER, *Assistant Examiner.*